(12) United States Patent
Lair

(10) Patent No.: US 7,146,796 B2
(45) Date of Patent: Dec. 12, 2006

(54) NESTED LATCH THRUST REVERSER

(75) Inventor: Jean-Pierre Lair, San Antonio, TX (US)

(73) Assignee: The Nordam Group, Inc., Tulsa, OK (US)

(*) Notice: Subject to any disclaimer, the term of this patent is extended or adjusted under 35 U.S.C. 154(b) by 235 days.

(21) Appl. No.: 10/929,809

(22) Filed: Aug. 30, 2004

(65) Prior Publication Data
US 2005/0102996 A1 May 19, 2005

Related U.S. Application Data

(60) Provisional application No. 60/500,767, filed on Sep. 5, 2003.

(51) Int. Cl.
*F02K 3/02* (2006.01)

(52) U.S. Cl. .................. 60/226.2; 60/230; 244/110 B; 239/265.25

(58) Field of Classification Search .............. 60/226.2, 60/230; 239/265.25, 265.39; 244/110 B
See application file for complete search history.

(56) References Cited

U.S. PATENT DOCUMENTS

| | | | |
|---|---|---|---|
| 3,503,211 A | | 3/1970 | Medawar et al. |
| 3,614,037 A | | 10/1971 | Vdolek |
| 3,779,010 A | | 12/1973 | Chamay et al. |
| 3,829,020 A | | 8/1974 | Stearns |
| 4,922,713 A | | 5/1990 | Barbarin et al. |
| 5,224,342 A | * | 7/1993 | Lair ............................ 60/230 |
| 5,404,714 A | * | 4/1995 | Davies ....................... 60/226.2 |
| 5,547,130 A | * | 8/1996 | Davies ................... 239/265.29 |
| 5,655,360 A | | 8/1997 | Butler |
| 5,720,449 A | * | 2/1998 | Laboure et al. .......... 244/110 B |
| 5,735,557 A | * | 4/1998 | Harvey ....................... 292/216 |
| 5,779,192 A | | 7/1998 | Metezeau et al. |
| 5,782,434 A | * | 7/1998 | Jean ........................ 244/110 B |
| 5,826,823 A | | 10/1998 | Lymons et al. |
| 5,913,476 A | | 6/1999 | Gonidec et al. |
| 6,021,636 A | * | 2/2000 | Johnson et al. ............. 60/226.2 |
| 6,216,980 B1 | * | 4/2001 | Baudu et al. ............ 244/110 B |
| 6,293,489 B1 | * | 9/2001 | Davies ....................... 244/12.5 |
| 6,568,172 B1 | | 5/2003 | Jannetta et al. |
| 6,604,355 B1 | * | 8/2003 | Sternberger ................. 60/226.2 |
| 6,622,964 B1 | * | 9/2003 | Rouyer et al. .......... 244/110 B |
| 6,688,098 B1 | * | 2/2004 | Rouyer et al. ............. 60/226.2 |
| 2004/0068978 A1 | | 4/2004 | Lair et al. |

FOREIGN PATENT DOCUMENTS

EP   0580 352 A1 *  1/1994

OTHER PUBLICATIONS

U.S. Appl. No. 10/802,889, filed Mar. 16, 2004, J.P. Lair.

\* cited by examiner

*Primary Examiner*—William H. Rodríguez
(74) *Attorney, Agent, or Firm*—Francis L. Conte

(57) ABSTRACT

A thrust reverser includes reverser doors pivotally mounted in a nacelle. Each door includes a latch pin mounted at a distal end thereof. A complementary latch hook is pivotally mounted in the nacelle for engagement with the pin to latch closed the reverser door. A rotary retainer adjoins the hook for blocking rotation of the hook to latch closed the door, and selectively unblock rotation of the hook to permit the pin to disengage the hook.

20 Claims, 12 Drawing Sheets

NESTED LATCH THRUST REVERSER

This application claims the benefit of U.S. Provisional Applications 60/500,767; filed Sep. 5, 2003.

BACKGROUND OF THE INVENTION

The present invention relates generally to aircraft engines, and, more specifically, to thrust reversers therein.

A typical turbofan aircraft engine includes a fan powered by a core engine for producing propulsion thrust for powering the aircraft in flight. The core engine typically has in serial flow communication a multistage axial compressor, annular combustor, and high pressure turbine joined to the compressor by one shaft. A second shaft joins the fan to a low pressure turbine disposed downstream from the high pressure turbine.

The engine also includes a fan nacelle surrounding the cowling or nacelle of the core engine which defines an annular bypass duct therebetween. The nacelle may be short and terminates in a fan outlet nozzle surrounding the core engine upstream from an independent core exhaust nozzle at the downstream end thereof. Or, the fan nacelle may be long and extends downstream past the core nozzle for collectively discharging both the fan bypass air and the core exhaust in a common exhaust nozzle disposed downstream therefrom.

The turbofan engine typically also includes a fan thrust reverser for providing aerodynamic braking during aircraft landing on a runway. Various types of fan thrust reversers are known in the art, one of which includes pivoting doors that block the aft travel of the fan air in the bypass duct and redirect it in the forward direction for reversing the direction of fan air thrust.

The known fan reversers have various advantages and various disadvantages relating to complexity, size, weight, and cost. And, the pivoting door fan reverser requires redundant locking or latching devices for preventing inadvertent in-flight deployment thereof.

In a large turbofan engine, there may be four pivoting doors spaced around the nacelle, with each of those four doors requiring three independent latches for satisfying government certification requirements. Accordingly, twelve independent latches would be required for the entire fan reverser, and correspondingly increase the complexity and cost of the reverser system and its control.

U.S. Pat. No. 6,895,742, assigned to the present assignee, discloses an improved bifold door thrust reverser having many advantages over typical fan thrust reversers. The bifold door reverser includes outer and inner doors which are deployed in opposition for blocking and turning the fan bypass flow during thrust reverse operation. A gang of the outer doors may be deployed in unison with a common inner door, all deployed using a common actuator.

The outer and inner doors maintain continuity of the outer and inner skins of the nacelle when stowed, and the actuation mechanism is fully contained in the nacelle between the two skins. The bifold door reverser is relatively compact and requires relatively small stroke of the actuators used therein.

And, the compact and nested configuration of the outer and inner doors in the bifold door reverser permit therein the introduction of a new locking or latching system as further described hereinbelow.

BRIEF SUMMARY OF THE INVENTION

A thrust reverser includes reverser doors pivotally mounted in a nacelle. Each door includes a latch pin mounted at a distal end thereof. A complementary latch hook is pivotally mounted in the nacelle for engagement with the pin to latch closed the reverser door. A rotary retainer adjoins the hook for blocking rotation of the hook to latch closed the door, and selectively unblock rotation of the hook to permit the pin to disengage the hook.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
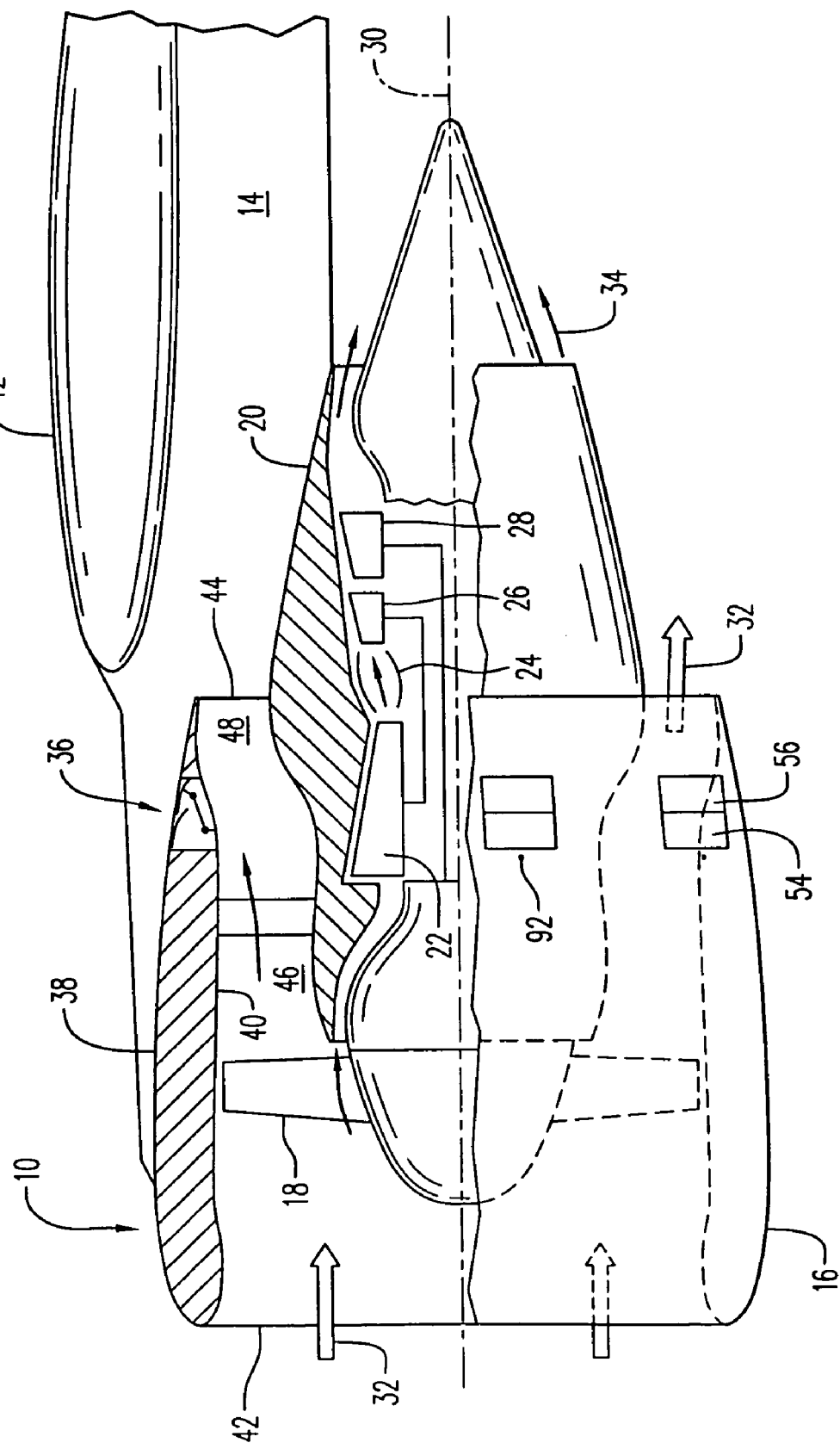
FIG. 1 is a partly sectional axial view of an exemplary turbofan aircraft gas turbine engine mounted to an aircraft wing, and including a fan thrust reverser integrated in the fan nacelle thereof.

Illustrated in FIG. 1 is a turbofan aircraft gas turbine engine 10 suitably mounted to the wing 12 of an aircraft by a supporting pylon 14. Alternatively, the engine could be mounted to the fuselage of the aircraft if desired.

The engine includes an annular fan nacelle 16 surrounding a fan 18 which is powered by a core engine surrounded by a core nacelle or cowl 20. The core engine includes in serial flow communication a multistage axial compressor 22, an annular combustor 24, a high pressure turbine 26, and a low pressure turbine 28 which are axisymmetrical about a longitudinal or axial centerline axis 30.

During operation, ambient air 32 enters the fan nacelle and flows past the fan blades into the compressor 22 for pressurization. The compressed air is mixed with fuel in the combustor 24 for generating hot combustion gases 34 which are discharged through the high and low pressure turbine 26,28 in turn. The turbines extract energy from the combustion gases and power the compressor 22 and fan 18, respectively.

A majority of the air is pressurized by the driven fan 18 for producing a substantial portion of the propulsion thrust powering the aircraft in flight. The combustion gases 34 are exhausted from the aft outlet of the core engine for providing additional thrust.

However, during landing operation of the aircraft, thrust reversal is desired for aerodynamically slowing or braking the speed of the aircraft as it decelerates along a runway. Accordingly, the turbofan engine 10 includes a fan thrust reverser 36 wholly contained in or integrated into the fan nacelle 16 for selectively reversing fan thrust during aircraft landing.

The fan thrust reverser, or simply fan reverser 36 is integrated directly into the fan nacelle 16. The fan nacelle includes radially outer and inner cowlings or skins 38,40 which extend axially from a leading edge of the nacelle defining an annular inlet 42 to an opposite trailing edge defining an annular outlet 44. As additionally shown in FIGS. 2 and 3, the fan nacelle 16 may have any conventional configuration, and is typically formed in two generally C-shaped halves which are pivotally joined to the supporting pylon 14 for being opened during maintenance operations.

The exemplary fan nacelle illustrated in FIGS. 1–4 is a short nacelle terminating near the middle of the core engine for discharging the pressurized fan airflow separately from and surrounding the exhaust flow 34 discharged from the aft outlet of the core engine. In alternate embodiments, the fan nacelle could be long and extend downstream of the core engine for providing a single, common outlet for both the fan air and the core exhaust.

In the exemplary embodiment illustrated in FIG. 1, the core engine is mounted concentrically inside the fan nacelle 16 by a row of supporting struts in a conventional manner. The core cowl 20 is spaced radially inwardly from the inner skin 40 of the fan nacelle to define an annular bypass duct 46 therebetween which bypasses a major portion of the fan air around the core engine during operation. The fan bypass duct terminates in an annular fan nozzle 48 at the nacelle trailing edge or outlet 44.

A particular advantage of the fan reverser 36 is that the fan nozzle 48 itself may remain fixed at the aft end of the fan nacelle surrounding the core engine. And, the fan reverser 36 may be fully integrated in the fan nacelle immediately forward or upstream from the fixed fan nozzle.

Figure 5:
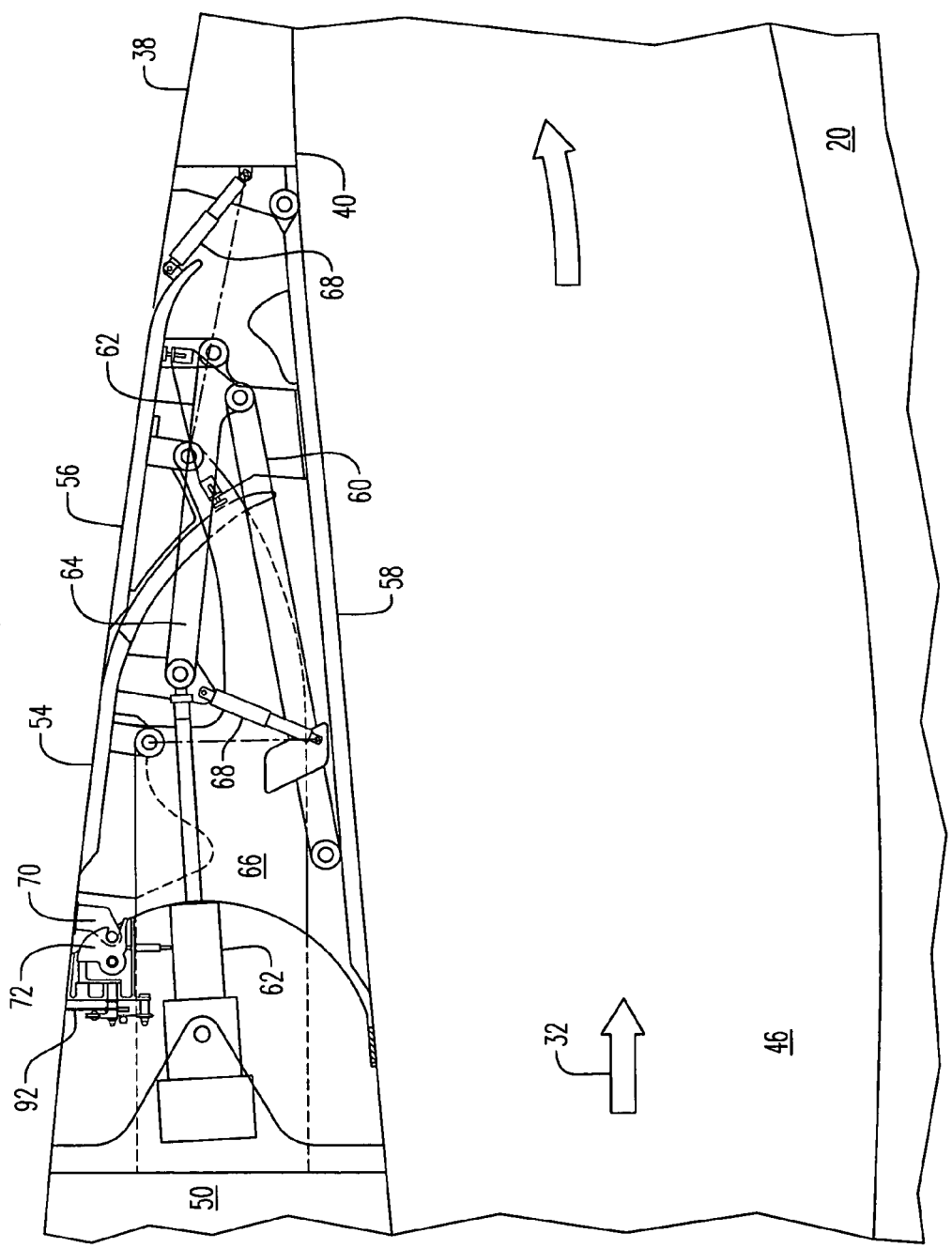
FIG. 5 is an axial sectional view of the fan reverser illustrated in FIGS. 1–4 in a stowed position.
Figure 6:
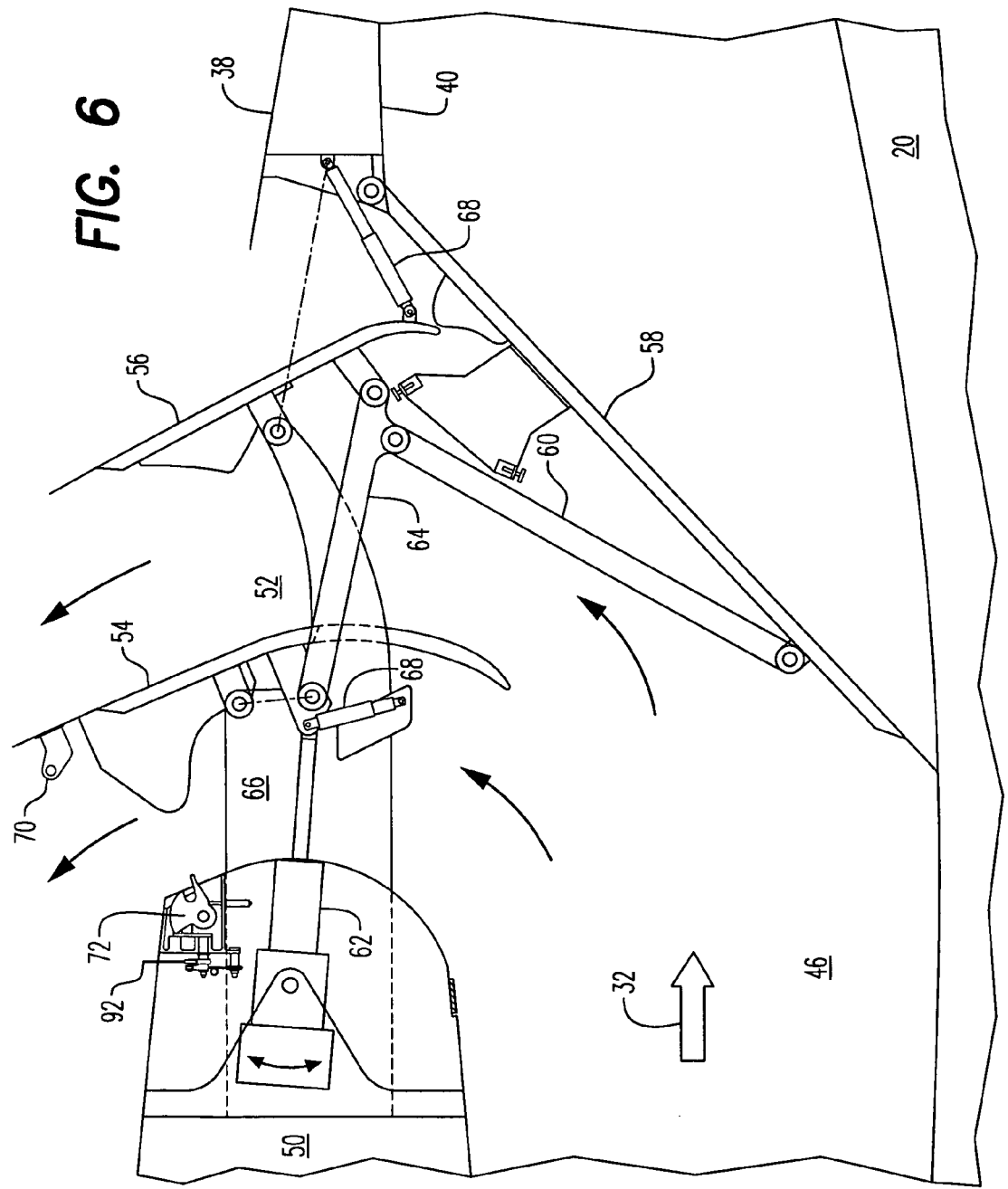
FIG. 6 is an axial sectional view of the fan reverser illustrated in FIG. 5 shown in a deployed position.

More specifically, the fan reverser is illustrated in more detail in FIGS. 5 and 6 wherein the outer and inner skins 38,40 are spaced radially apart to define an arcuate compartment or annulus 50 spaced axially forwardly from the nacelle trailing edge 44. The nacelle compartment 50 includes a flow tunnel or aperture 52 extending radially between the inner and outer skins through which the pressurized fan bypass air 32 may be discharged during thrust reverse operation.

At least one, and preferably a gang or set of radially outer louver doors 54,56 are suitably pivotally joined to the fan nacelle in the compartment 50 to close the exit end of the tunnel along the outer skin 38. Two or more of the louver doors may be axially nested together as further described hereinbelow.

A corresponding radially inner reverser or blocker door 58 is suitably pivotally joined to the fan nacelle 16 inside the compartment 50 in radial opposition with the gang of louver doors to close the inlet end of the tunnel along the inner skin 40. In the stowed closed position illustrated in FIG. 5, the inner door is folded closed generally parallel with the corresponding gang of outer doors, converging slightly to conform with the converging profile or cross section of the nacelle.

Figure 2:
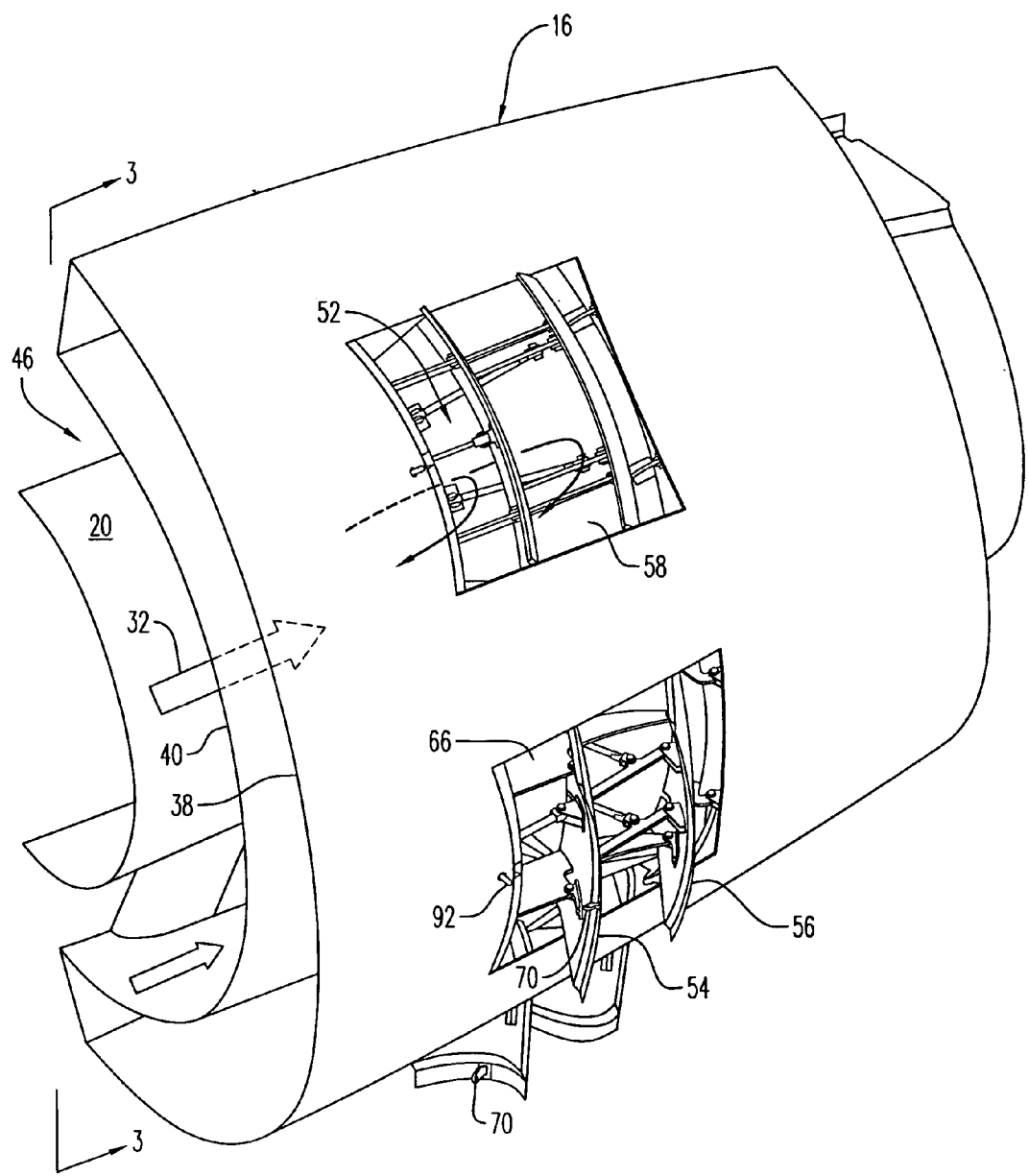
FIG. 2 is an isometric view of a symmetrical half of the fan nacelle shown in FIG. 1 illustrating deployment of the fan thrust reverser therein.
Figure 3:
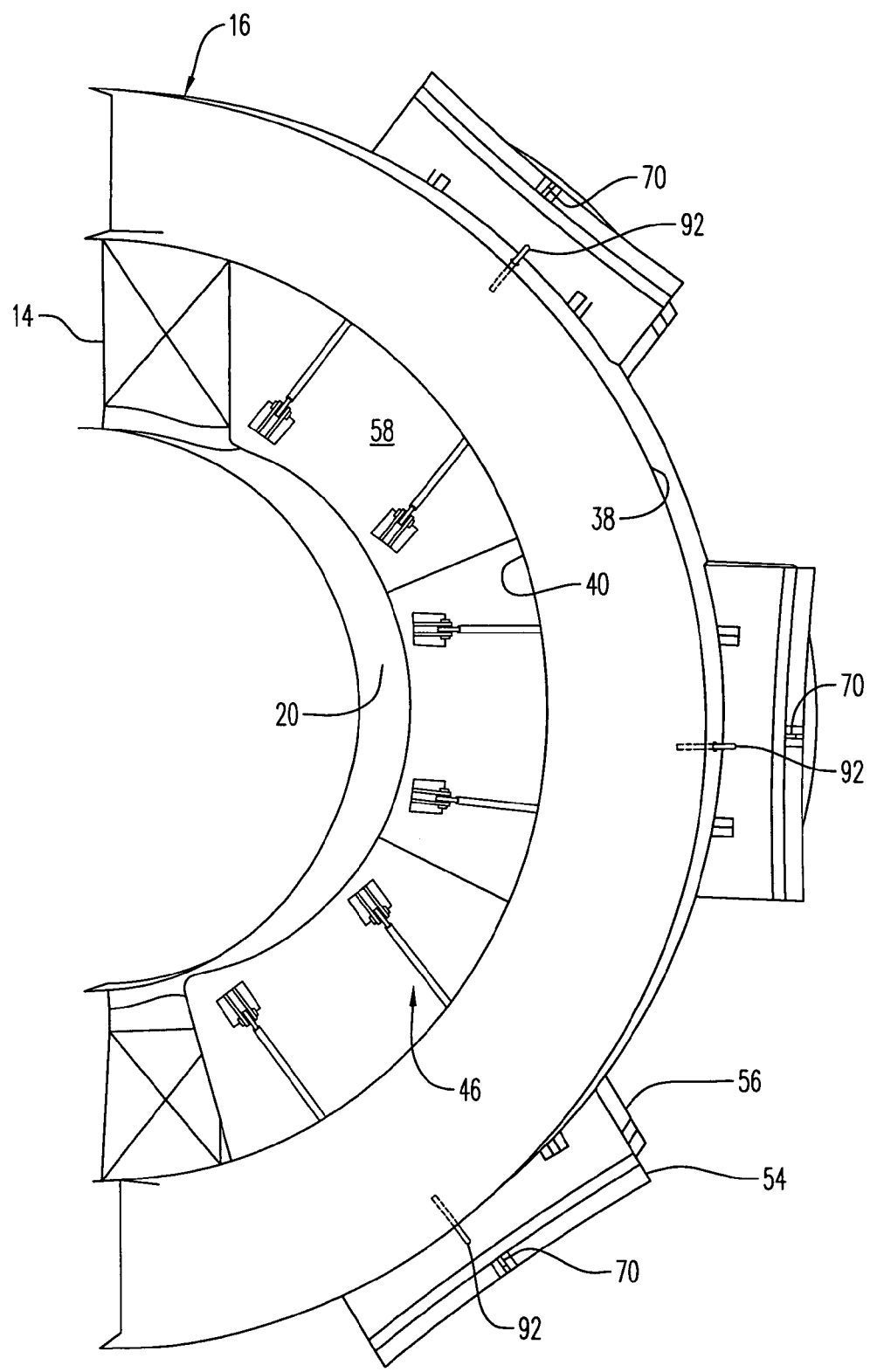
FIG. 3 is a radial sectional view of the nacelle illustrated in FIG. 2 and taken generally along line 3—3.

Since the fan bypass duct 46 illustrated in FIGS. 1–3 is substantially annular, the fan reverser includes corresponding groups of the louver doors 54,56 and cooperating blocker door 58 spaced circumferentially apart around the perimeter of the fan nacelle 16. For example, in each half C-duct portion of the fan nacelle, three groups of the blocker and louver doors are uniformly spaced apart from each other.

The three blocker doors 58 in each nacelle half preferably have trapezoidal configurations for circumferentially adjoining each other inside the inner skin 40 when deployed as illustrated in FIG. 3 for blocking the fan flow from exiting through the fan nozzle. Instead, the fan flow is diverted through the open louver doors as illustrated in FIG. 2 and directed axially forwardly for providing thrust reverse operation in landing of the aircraft.

An elongate drive link 60 pivotally joins together the outer and inner doors for coordinating the simultaneous deployment thereof. Means in the form of a linear drive actuator 62 are suitably mounted in the nacelle compartment and joined to the doors for selective rotation thereof from the stowed position illustrated in FIG. 5 at which the doors are pivoted closed substantially flush in the outer and inner skins 38,40 respectively.

For example, in FIGS. 5 and 6, the drive actuator 62 is pivotally joined to the fan nacelle in a suitable cradle inside the reverser compartment 50, and the output rod thereof is directly pivotally joined to the middle of the forward louver door 54. In this way, the output rod of the actuator 62 is unconstrained to move with the forward louver door 54 as it rotates between the deployed and stowed positions.

The actuator 62 may be operated in reverse for rotating the doors to the deployed position illustrated in FIG. 6 at which the outer doors 54,56 are pivoted open and extend radially outwardly in part from the outer skin 38, with the inner door 58 being pivoted open and extending radially inwardly in most part from the inner skin 40. The outer and inner doors are interconnected by the drive link 60 in an accordion or bifold manner in which the doors collapse or fold together in the stowed position illustrated in FIG. 5, and swing open with opposite inclinations in the deployed position illustrated in FIG. 6.

In the preferred embodiment illustrated in FIGS. 5 and 6, a pair of the outer louver doors 54,56 are arranged in axial series in the common flow tunnel 52 in axial and circumferential alignment atop the common blocker door 58 disposed therebelow. An elongate unison link 64 pivotally joins together the gang of louver doors 54 so that they may open and close simultaneously in the manner of commonly known louver windows.

The common drive link 60 pivotally joins together the gang of louver doors and the complementary blocker door 58. The drive actuator 62 may then be used for deploying outwardly in unison the louver doors as the cooperating blocker door is simultaneously deployed inwardly. In this way, the one set of blocker and louver doors may be deployed simultaneously as the doors unfold from each other, with the louver doors being inclined radially outwardly and facing forwardly, and the blocker door being inclined radially inwardly and forwardly in the deployed position illustrated in FIG. 6.

The louver doors 54,56 illustrated in FIGS. 4–7 are configured for multiple purposes including smoothly closing the flow tunnel in the outer skin 38 when the louvers are stowed closed. And, when deployed open, the louver doors are inclined radially outwardly and forwardly for reversing direction of the fan bypass flow 32 for fan thrust reversal, while additionally turning the airflow through the flow tunnel.

Correspondingly, the inner blocker door 58 illustrated in FIG. 6 may be deployed radially inwardly into the bypass duct 46 in unfolding or bifold opposition with the outer louver doors 54,56. The blocker door 58 is suitably sized in axial length to radially reach the core cowl 20 when deployed. The blocker door therefore bridges the entire radial extent of the bypass duct 46 for blocking and diverting the fan bypass flow 32 radially outwardly into the oppositely inclined open louver doors which redirect the bypass flow axially forwardly for thrust reverse operation.

Figure 4:
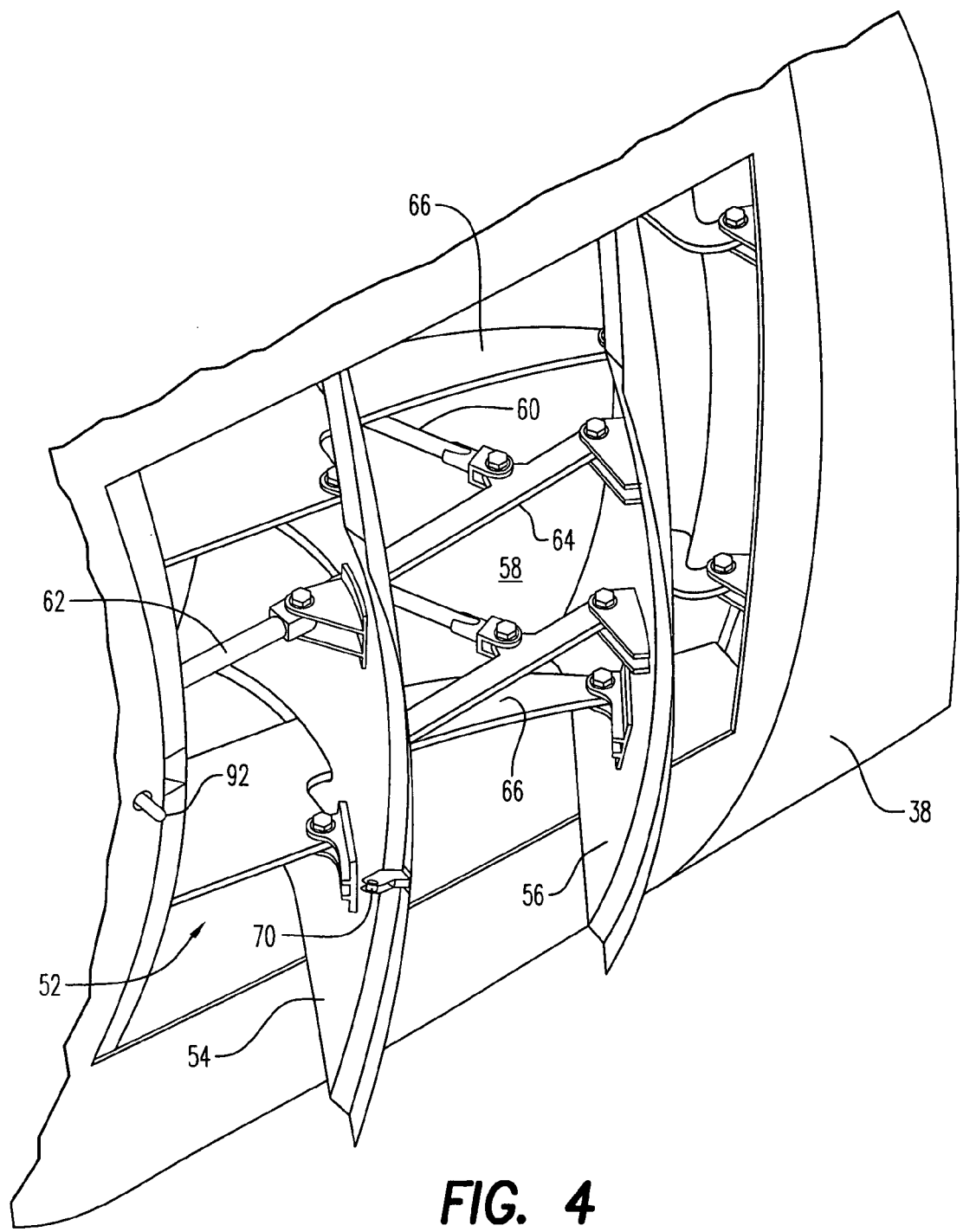
FIG. 4 is an enlarged isometric view of a representative set of the reverser doors illustrated in FIG. 2 in an exemplary embodiment.

The louver doors 54,56 and blocker door 58 may be suitably mounted to the fan nacelle in any convenient manner for effecting the improved deployment thereof as described above. For example, a pair of circumferentially spaced apart cantilevers 66 have corresponding proximal ends which are suitably fixedly mounted to the nacelle in the common compartment 50. The cantilevers are preferably thin beams circumferentially and thick radially to provide sufficient strength for supporting the louver doors therefrom while minimizing obstruction of the airflow during thrust reverse operation. As shown in FIG. 4, the two cantilevers 66 define with the two deployed louver doors a grate like those typically found in fixed cascade vanes, but using the movable louver doors.

The aft louver door 56 is suitably pivotally joined to the distal ends of the two cantilevers, with the forward louver door 54 being pivotally joined at an intermediate location on the cantilevers forward of the aft distal end thereof. In this way, the thin cantilevers support the louver doors under tension against the aerodynamic pressure loads exerted on the louver doors when deployed.

In FIGS. 4–6, a pair of the unison links 64 are correspondingly mounted to the louver doors 54,56 axially along respective ones of the two cantilevers 66. And, two corresponding drive links 60 extend from the aft ends of the unison links to the forward ends of the blocker doors.

The output rod of the pivoted actuator 62 may then be conveniently mounted to a suitable clevis at the middle of the forward louver door 54 between the two cantilevers as illustrated in FIG. 4. Deployment of the forward louver door in turn deploys the aft louver door and the common blocker door interconnected by the pairs of unison links 64 and drive links 60.

The various pivotal connections or joints required for the louver and blocker doors, actuating links, and drive actuator may be provided in any conventional manner. For example, suitable clevis brackets may be fixedly joined to the doors for pin mounting to the cantilevers, links, and corresponding internal frames in the nacelle.

In the preferred embodiment illustrated in FIGS. 4 and 6 the unison link 64 is pivotally joined to the two louver doors 54 in corresponding devises thereon mounted in the louver doors aft of the devises which pivotally join the louver doors to the cantilevers in the nacelle. In this way, the various components of the actuating means may be fully contained within the nacelle compartment 50 for efficiently kinematically opening and closing the doors in unison.

In the preferred embodiment illustrated in FIG. 6, the drive link 60 is pivotally joined between the aft end of the unison link 64 and the forward end of the blocker door 58. In this way, as the unison link is deployed aft in the nacelle, the drive link opens inwardly the attached blocker door which pivots at its aft end. Correspondingly, retraction forwardly of the unison link retracts outwardly the drive link and the attached blocker door to the stowed position illustrated in FIG. 5.

In FIG. 5, extension of the actuator rod in turn pushes aft the unison link 64 for pivoting closed the louver doors on their respective pivot joints while also pivoting closed the interconnected blocker door. In FIG. 6 the actuator rod is retracted forwardly which in turn pulls the unison link 64 forwardly for pivoting open the two louver doors around their respective pivot axes while driving radially inwardly the drive link for opening the blocker door.

Although extension of the actuator 62 illustrated in FIG. 5, and the internal pressure of the fan bypass flow 32 cooperate to maintain closed the blocker and louver doors, it is also desirable to provide a further mechanism for locking closed the doors of the thrust reverser.

More specifically, the interconnected bifold configuration of the louver doors 54,56 and the cooperating blocker door 58 permits the introduction of a relatively simple mechanism for self-locking or self-latching the cooperating doors in their stowed positions without the need for external power or control dedicated thereto. This self-locking capability is effected by introducing one or more substantially identical toggle links 68 suitably pivotally joined between one or both louver doors 54,56 and the supporting nacelle 16 as illustrated in FIGS. 5 and 6, for example.

For the forward toggle link 68, its outer distal end is laterally offset axially aft in the outboard direction of its vertical toggle line in the stowed position of the forward louver door 54, and oppositely laterally offset axially forwardly in the inboard direction of its toggle line in the deployed position of the forward louver door. In other words, the toggle link 68 toggles between the opposite sides of the forward toggle line relative to the corresponding hinge axis of the forward louver door 54.

Correspondingly, for the aft toggle link, the left distal end thereof is laterally offset radially outwardly in the outboard direction of its horizontal toggle line in the stowed position of the door, and oppositely laterally offset radially inwardly of its toggle line in the deployed position of the aft louver door. The aft toggle link 68 therefore similarly toggles between the opposite sides of the aft toggle line between the stowed and deployed positions of the aft louver door 56.

The forward and aft toggle links 68 are preferably telescopic and vary in length as they are toggled during operation. The toggle links are suitably configured for requiring increasing compression force as their lengths decrease between their opposite proximal and distal ends, by using an internal compression spring for example.

As indicated above, the two louver doors 54,56 cooperate with the inner blocker door 58 using the corresponding drive links 60 therebetween. Each of the two louver doors 54,56 as disclosed above may be independently locked or latched using the corresponding toggle link 68 actuated by the common drive actuator 62 which rotates open or closed the louver and blocker doors.

Whereas the toggle links described above are passive devices for latching closed the louver doors upon stowing thereof, an additional level or redundancy to latch closed the louver doors is required for meeting government certification requirements. Active latching of the louver doors may be effected as described further hereinbelow with a relatively simple system with enhanced durability for securely latching closed the louver doors notwithstanding the aerodynamic or mechanical opening or closing loads thereon.

As initially illustrated in FIG. 4, each of the forward louver doors 54 includes a latch pin 70 fixedly mounted to the middle of the forward distal end of the door and extending radially inwardly. The pin itself is oriented in the circumferential direction, and is suitably mounted between two side plates in an integrated bracket mounted to the underside of the leading edge lip of the forward louver door.

Figure 7:
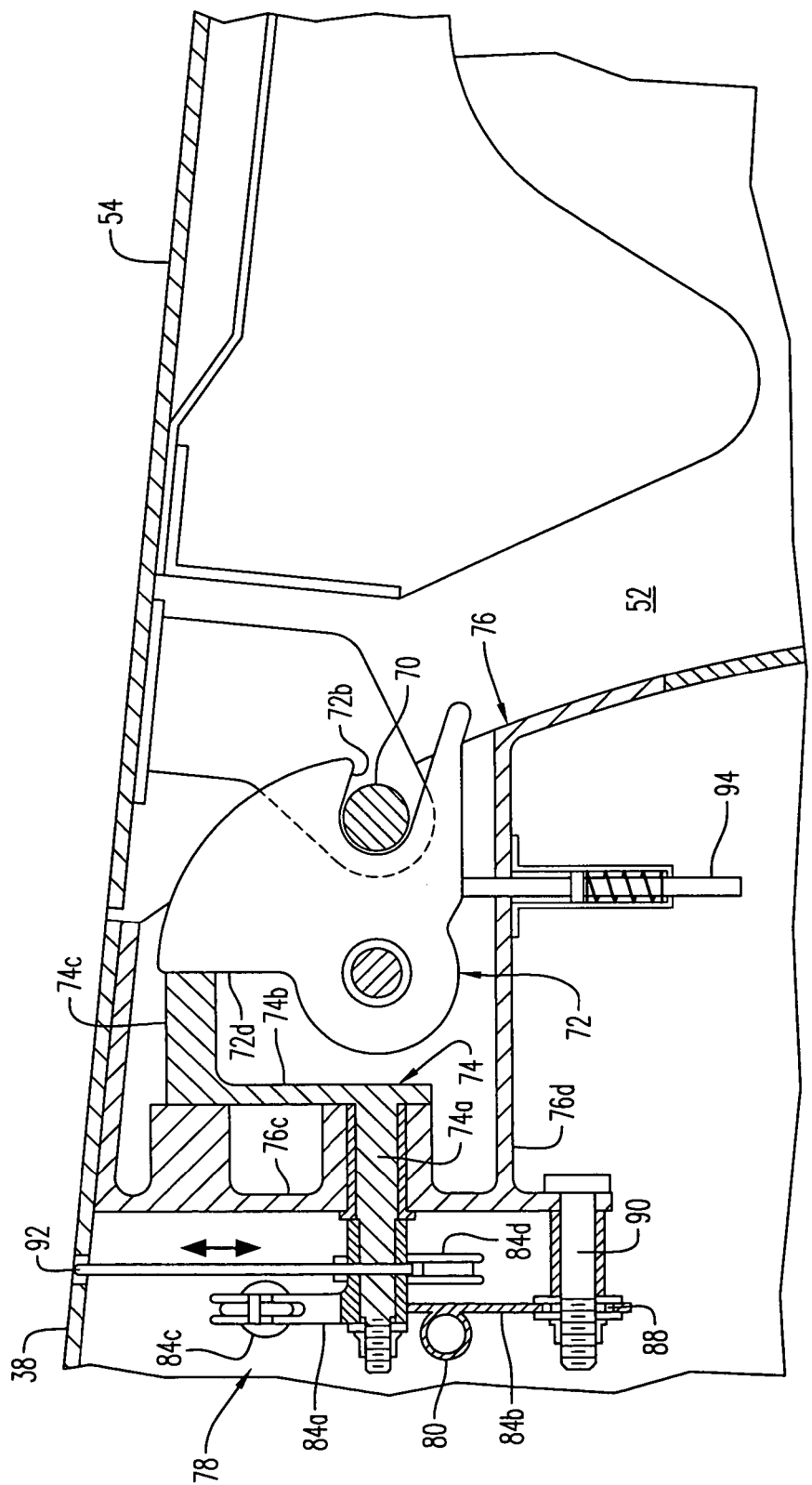
FIG. 7 is an enlarged axial sectional view of the latching mechanism for the closed forward louver door illustrated in FIG. 5.
Figure 8:
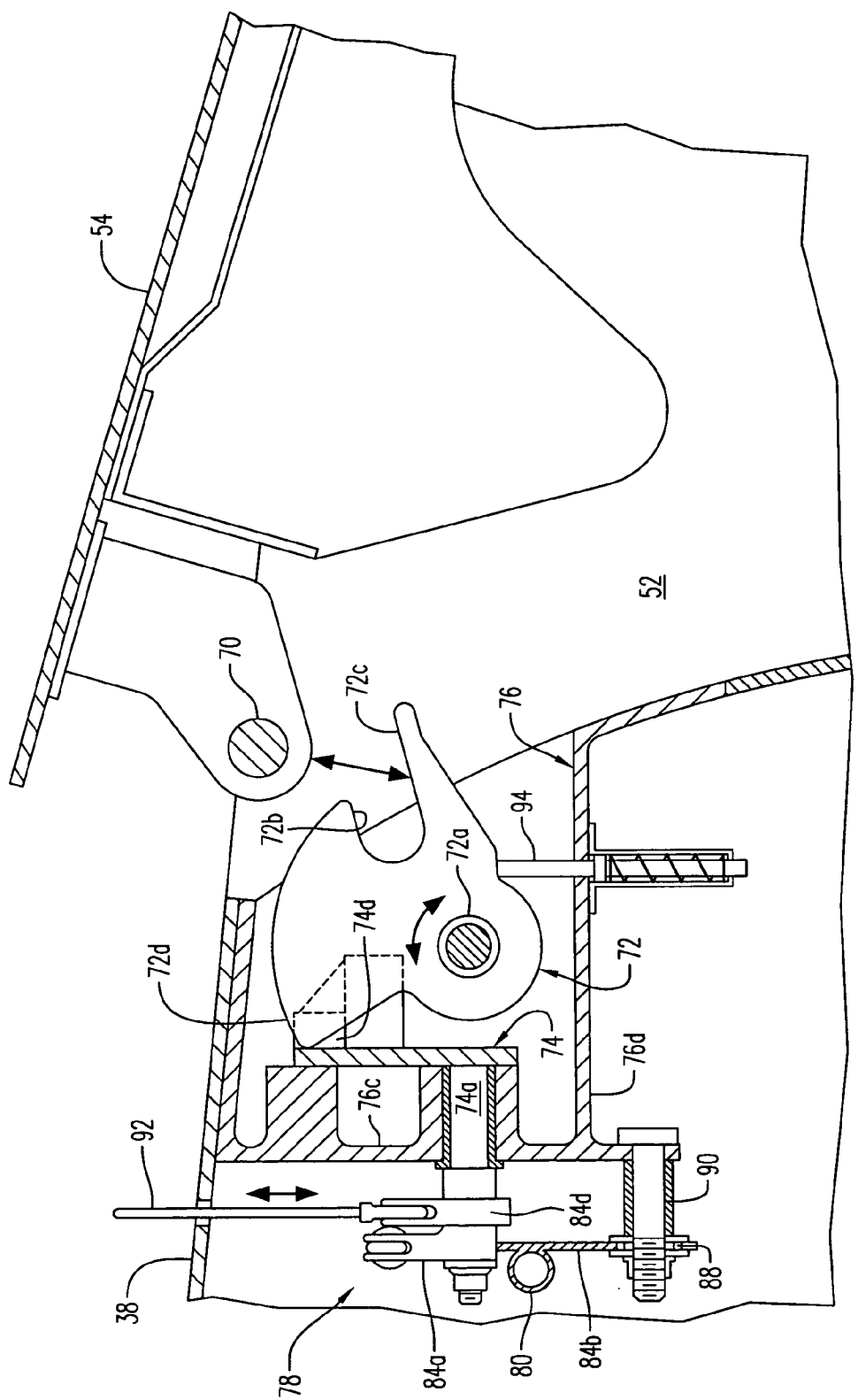
FIG. 8 is an enlarged axial sectional view of the latching mechanism for the open forward louver door illustrated in FIG. 6.

FIGS. 5 and 7 illustrate the forward louver door latched closed, with FIGS. 6 and 8 illustrating unlatching thereof for thrust reverser operation. Each of the latch pins 70 cooperates with a complementary rotary latch hook 72 pivotally mounted to the nacelle. The latch hook has a latched or closed rotary position as illustrated in FIG. 7 which engages the latch pin 70 therein for locking or latching closed the forward louver door 54 in the outer skin. The latch hook also has an opposite open or unlatched rotary position as illustrated in FIG. 8 which permits the latch pin 70 to disengage therefrom as the forward reverser door 54 is deployed radially outwardly.

In order to lock or latch the rotary latch hook 72 itself, a rotary retainer 74 adjoins the forward side of the hook 72. In this way, the retainer provides a nested latch for the primary latch hook 72 in series with the latch pin which can only be disengaged from the latch hook when the retainer permits rotation of the latch hook between its latched and unlatched positions.

Figure 10:
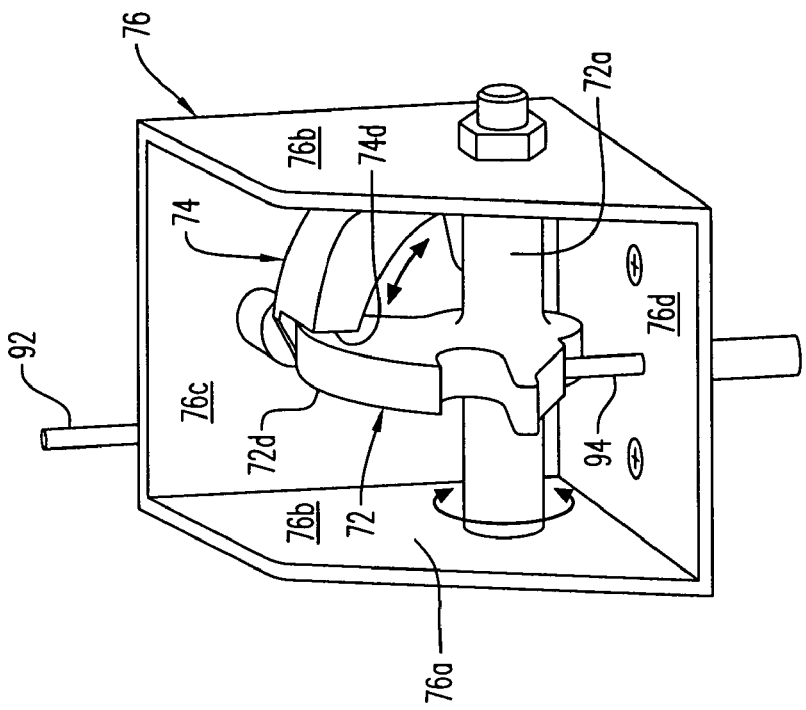
FIG. 10 is an isolated isometric view of the open latch and unblocked retainer therefor for the latch illustrated in FIG. 8.
Figure 9:
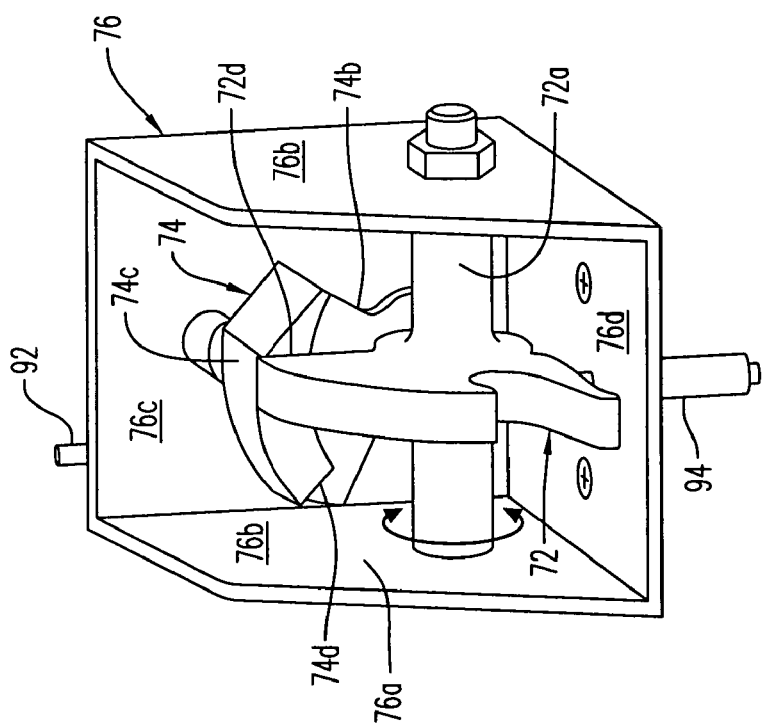
FIG. 9 is an isolated isometric view of the closed latch and blocking rotary retainer therefor for the latch illustrated in FIG. 7.

FIGS. 7 and 9 illustrate the latched or closed position of the latch hook, with FIGS. 8 and 10 illustrating the unlatched or open position of the latch hook. In the preferred embodiment illustrated in these Figures, a structural latch box 76 is suitably fixedly mounted to a corresponding radial frame inside the skins of the nacelle for each of the forward louver doors in alignment with the corresponding latch pin 70 at the forward end of each door.

The latch box is illustrated in isolation in FIGS. 9 and 10 and includes an open pocket 76a facing aft and radially outwardly toward the respective latch pin 70 as illustrated in FIGS. 7 and 8. Each latch box also includes a pair of radial sidewalls 76b integrally joined to a radial back wall 76c and axial bottom wall 76d.

The four sides of the latch box are fixedly joined together in a common casting or fabrication and provide substantial structural rigidity and strength for carrying reaction loads from each of the forward louver doors into the supporting frame of the nacelle. As shown in FIGS. 9 and 10, each latch hook 72 includes a supporting shaft 72a which is pivotally mounted inside the latch box between the opposite sidewalls thereof using a suitable fastener extending therethrough.

Correspondingly, each rotary retainer 74 as illustrated in FIGS. 7 and 8 includes a supporting shaft 74a which is pivotally mounted through the back wall of the box inside a corresponding bushing therefor.

In this configuration when the latch hook is closed as illustrated in FIGS. 7 and 9, any aerodynamic or mechanical loads developed in the forward louver door 54 are carried as reaction loads through the corresponding latch pin 70, latch hook 72, and latch box 76 into the supporting frame inside the nacelle. Since the purpose of the rotary retainer 74 is to retain the latch hook in its closed position as illustrated in FIGS. 7 and 9, the retainer may be a relatively simple component with a simple actuation system therefor for reducing its complexity and overall weight in the aircraft engine.

The latch hook 72 is illustrated in FIG. 8 in the preferred embodiment in the form of a flat plate integrally joined to its supporting shaft. The plate includes a slot 72b sized in width for receiving the latch pin 70. The slot 72b extends parallel to an outwardly or aft projecting tab or ledge 72c at an aft end of the slot which receives the latch pin 70 during the stowing sequence.

The latch hook 72 also includes a corner 72d at the forward or upstream end thereof which cooperates with the rotary retainer for blocking and unblocking rotary movement of the latch hook when desired.

More specifically, the rotary retainer 74 illustrated in FIG. 9 includes a thin back plate 74b from which extends the integral shaft thereof. The back plate 74b includes a cam 74c extending in part circumferentially along the perimeter of the back plate and is configured to abut the forward face of the corner 72d of the latch hook for blocking rotation thereof as illustrated in FIGS. 7 and 9. The cam 74c terminates at a step 74d to receive the corner 72d and unblock rotation of the hook 72 as shown in FIG. 10.

As best illustrated in FIG. 7, the cam 74c is a locally large portion of the rotary retainer which axially engages the forward face of the corner 72d and the aft face of a locally enlarged stop region of the back wall 76c of the latch box. In the position illustrated in FIG. 7, the cam 74c blocks the latch hook 72 to its closed position in which the slot 72b faces aft and radially inwardly to trap the latch pin 70 therein and prevent deployment of the forward louver door 54.

All reaction loads from the door 54 are carried through the pin 70 and through the hook 72 into the supporting latch box. Some of the reaction loads are carried in compression through the cam 74c into the back wall of the latch box, and the majority of reaction load is carried through the supporting shaft of the latch hook into the sidewalls of the latch box.

In order to unlock the latch hook 72 as illustrated in FIGS. 8 and 10, the retainer 74 is rotated to align the perimeter step 74d with the corner 72d of the latch hook which disconnects the cam therefrom. The latch hook as illustrated in FIG. 8 is then permitted to rotate over a small arc counterclockwise to position the slot 72b radially outwardly in the aft direction and permit disengagement of the latch pin 70 from the retaining slot 72b.

Figure 11:
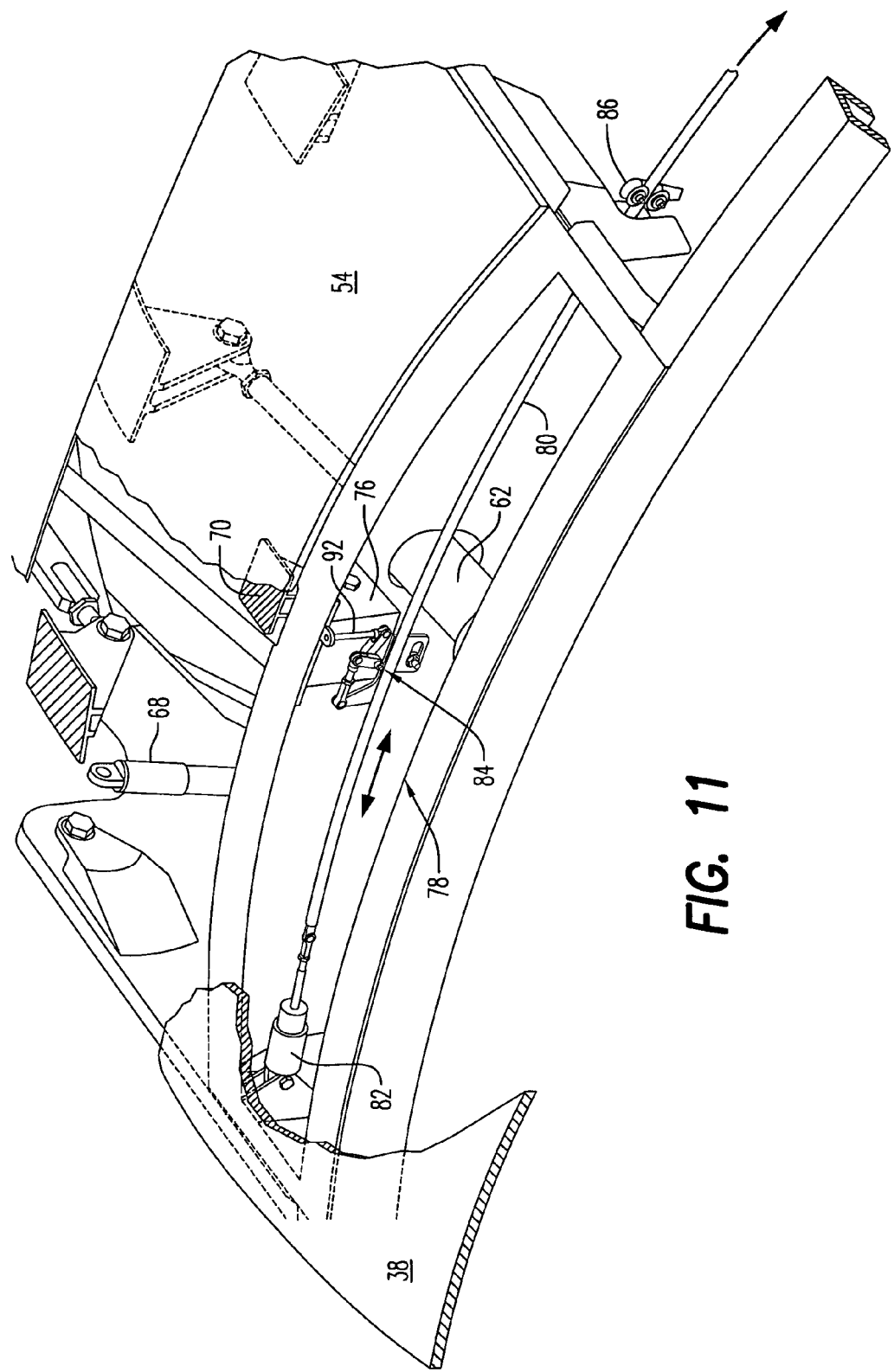
FIG. 11 is an isometric view of the latching mechanism for controlling operation of the latches illustrated in FIG. 7–10.

FIGS. 7, 8, and 11 illustrate a preferred form of a control mechanism or means 78 for selectively rotating the rotary retainer 74 inside the latch box 76. The control mechanism 78 is specifically configured for rotating the retainer 74 in one direction as illustrated in FIG. 7 to position the cam 74c adjacent the hook corner 72d to block rotation of the hook to in turn retain the pin 70 in the slot 72b. The control mechanism also permits rotation of the retainer 74 in an opposite direction as illustrated in FIG. 8 to align the step 74d with the hook corner 72d and unblock rotation of the hook to permit disengagement of the pin from the slot.

As initially illustrated in FIG. 11, the control mechanism 78 includes an arcuate control rod 80 extending circumferentially behind the corresponding latch boxes 76 on the upstream sides thereof. A suitable linear actuator 82 is suitably joined to the proximal end of the control rod 80. The actuator 82 for deploying the rotary retainer may have any conventional configuration such as electrical, pneumatic, or hydraulic, and preferably includes an internal spring to bias the output rod thereof in its extended position, with power being required to retract the output rod.

In this way, the latch actuator 82 is joined to the control rod 80 for rotating it in opposite clockwise and counterclockwise directions relative to the axial centerline axis of the nacelle and provides a convenient mechanism for simultaneously controlling the corresponding rotary retainers for the several latch boxes and reverser doors in each half of the nacelle.

The common control rod 80 is suitably joined to each of the rotary retainers by corresponding linkage 84 for rotating the retainers in opposite directions corresponding with the opposite rotary directions of the common control rod.

Figure 12:
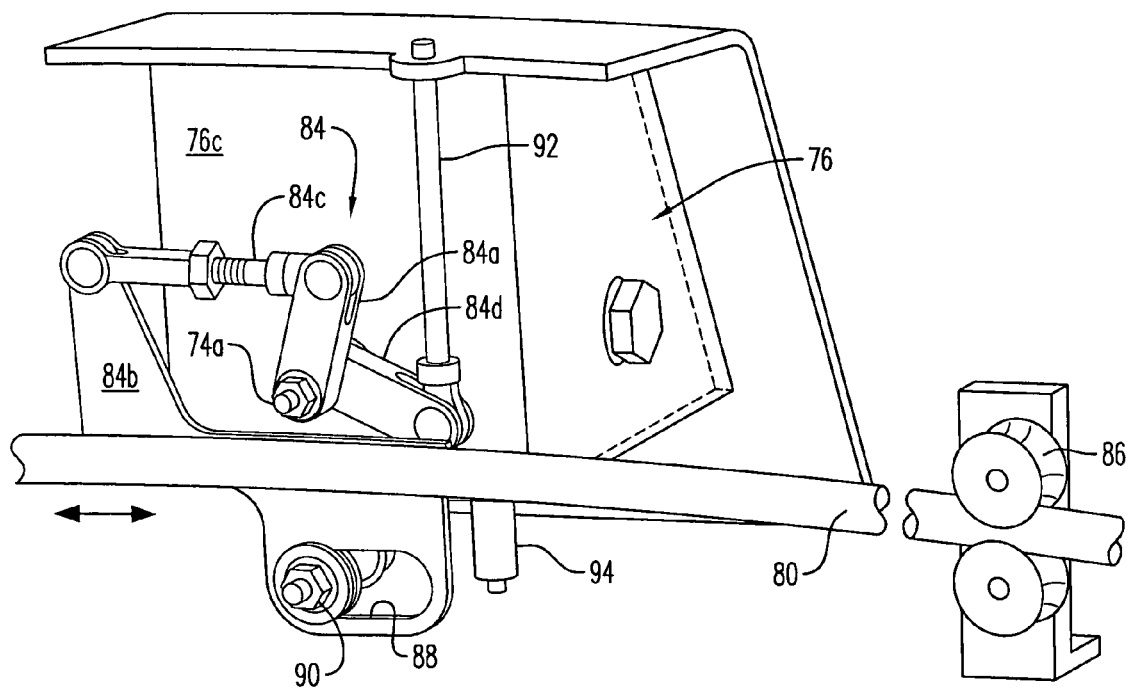
FIG. 12 is an enlarged isometric view of a portion of the control rod illustrated in FIG. 11 and associated linkage for controlling one of the door latch hooks in a preferred embodiment.
Figure 13:
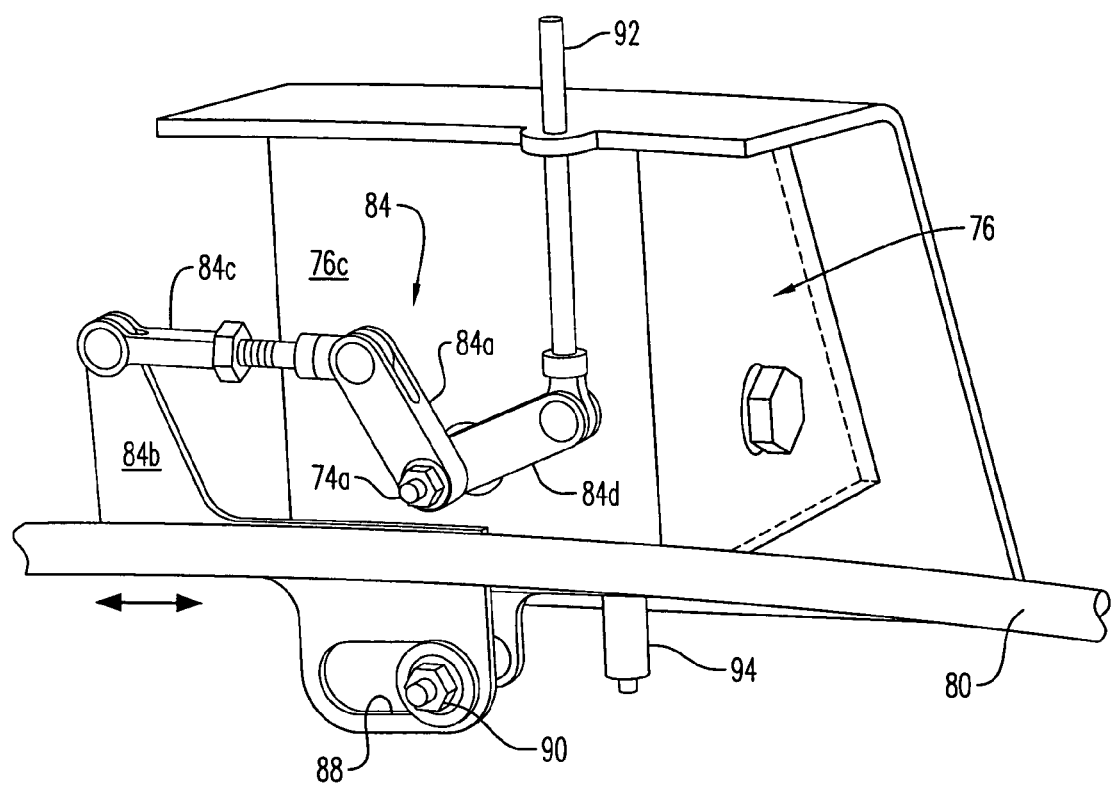
FIG. 13 is an isometric view, like FIG. 12, of the control linkage positioned to unlatch the reverser door.

FIGS. 12 and 13 illustrate the linkage 84 in a preferred embodiment. The linkage includes a first lever 84a fixedly joined to the distal end of the retainer shaft 74a which extends through the back wall 76c of the latch box from the back plate 74b of the rotary retainer. The linkage also includes a thin bracket 84b extending radially outwardly from the control rod 80, which is joined to the first lever 84a by an adjustable idler link 84c pivotally joined at opposite ends thereto.

The first lever 84a and the bracket 84b extend generally radially outwardly, with the idler link 84c extending circumferentially therebetween and generally parallel with the control rod 80. In this way, rotation of the control rod 80 about the axial centerline axis of the nacelle in turn rotates the first lever 84a and the affixed shaft 74a of the rotary retainer.

The idler link 84c may be joined in suitable devises at opposite ends to the first lever 84a and the bracket 84b and is adjustable in length for precisely controlling the opposite rotary positions of the first lever 84a as illustrated in FIGS. 12 and 13 for correspondingly positioning the cam 74c as illustrated in FIGS. 7 and 8 to block or unblock rotary movement of the latch hook.

The linkage 84 illustrated in FIGS. 12 and 13 may be duplicated at each of the latch boxes for ensuring the simultaneous operation of the corresponding rotary retainers in unison as the control rod 80 is rotated between its opposite positions. In the preferred embodiment, the spring driven actuator 82 illustrated in FIG. 11 ensures extension of its output rod without power to deploy the first levers 84a as illustrated in FIGS. 7 and 12 to their locking positions using the cams 74c to block unlocking of the several latch hooks 72.

To unlock the latch hooks, the latch actuator 82 is powered to retract its output rod and pull the control rod 80 to the unlocked position illustrated in FIGS. 8 and 13 and align the retainer step 74d with the hook corner 72d to permit disengagement of the latch pins from the corresponding latch hooks.

A particular advantage of the control mechanism 78 and its linkage 84 is the relatively simple configuration thereof and light weight since reaction loads from the several thrust reverser doors are not carried therethrough. Correspondingly, the latch actuator 82 may be relatively small and low powered, and have sufficient power for actuating the corresponding linkage 84 to rotate the rotary retainers 74 between their opposite rotary positions.

The control rod 80 illustrated in FIGS. 11 and 12 may be relatively simple with a small tubular configuration suitably mounted in a plurality of guide rollers 86 for permitting circumferential movement thereof with axial and radial restraint. The guide rollers 86 may be mounted in pairs to common supporting brackets affixed inside the nacelle, with the guide rollers having concave perimeters for trapping the tubular control rod 80 therebetween.

The bracket 84b as illustrated in FIG. 12 preferably includes a radially inner extension having a circumferential slot 88 therein slidingly mounted on a retention roller 90 suitably affixed to the latch box 76 as additionally illustrated in FIGS. 7 and 8. The roller 90 includes a pair of lips on opposite sides of the slot 88 which define a retention slot for preventing tilting of the control rod 80 out of its axial plane during circumferential movement of the control rod in the guide rollers.

An additional advantage of the control mechanism 78 initially illustrated in FIG. 11 is the ability to conveniently introduce a visual indicator of the latch and unlatch positions of the latch hook. This is illustrated in more detail in FIGS. 12 and 13.

For example, an indicator pin 92 may be mounted through a retaining aperture radially behind each of the latch boxes 76. A second lever 84d is fixedly joined at a proximal end to the distal end of the retainer shaft 74a in abutment with the first lever 84a. The distal end of the second lever 84d is pivotally joined to the proximal end of the indicator pin 92.

In this way, rotation of the retainer shaft 74a by the first lever 84a causes the second lever 84d to also rotate to correspondingly extend radially outwardly or retract radially inwardly the distal end of the indicator pin 92 from the outer skin of the nacelle where it would be visible to maintenance personnel as they conduct the typical walk around inspection of the aircraft prior to each flight.

The first and second levers 84a and 84d as shown in FIGS. 12 and 13 are generally normal to each other so that clockwise rotation of the levers as illustrated in FIG. 12 retracts radially inwardly the pin 92, and counterclockwise rotation of the levers as illustrated in FIG. 13 deploys radially outwardly the distal end of the indicator pin 92.

FIG. 7 illustrates the rotary position of the retainer 74 for blocking closed the latch hook 72 to latch closed the forward louver door 54, with the distal end of the indicator pin 92 being retracted flush in the outer skin 38 of the nacelle.

FIG. 8 illustrates the rotary position of the retainer 74 unblocking open the latch hook 72 to permit deployment of the thrust reverser, with the distal end of the indicator pin 92 protruding outwardly from the outer skin 38 and visible to the maintenance personnel.

In this way, the several indicator pins 92 corresponding with the several latch boxes for the several groups of thrust reverser doors around the perimeter of the engine nacelle are readily visible to ensure inspection of the latch and unlatch positions of the corresponding latch hooks from outside the nacelle.

As indicated above, the latch hook 72 illustrated in FIGS. 7 and 8 is simply pivotally mounted in the latch box, and its rotary position is controlled by the rotary position of the cooperating retainer 74. The retainer cam 74c illustrated in FIG. 7 effectively blocks rotation of the latch hook to lock the latch pin 70 inside the slot 72b.

Unlocking rotary movement of the latch hook 72 as illustrated in FIG. 8 permits the main actuator 62 as illustrated in FIG. 6 to deploy the thrust reverser doors and disengage the latch pin 70 from the latch hook 72 as it rotates counterclockwise in FIG. 8.

Since the latch hook 72 is pivotally mounted in the latch box for free rotary movement therein, a spring-driven plunger 94 is mounted through the bottom wall of the latch box in engagement with the underside of the ledge 72c. The plunger is driven radially outwardly by an internal compression spring to bias outward the ledge 72c of the latch hook when the retainer step 74d receives the hook corner 72d. The plunger therefore maintains the latch hook in its unlatched position at all times during deployment of the thrust reverser doors.

When the main actuator 62 illustrated in FIG. 6 is operated in reverse to stow the thrust reverser doors, the doors are driven radially inwardly as illustrated in FIG. 8 which in turn drives the latch pin 70 radially inwardly to engage the ledge 72c and depress the plunger 94 as the latch hook 72 simultaneously rotates clockwise to its closed position as illustrated in FIG. 7. In this way, the latch pin 70 is permitted to enter the upwardly directed slot 72b as it slides against the ledge 72c which simultaneously rotates closed the latch hook to trap the latch pin 70 upon complete stowing of the forward louver door 54 as illustrated in FIG. 7. The control mechanism is then actuated to position the retainer cam 74c between the back wall of the latch box and the forward corner 72d of the latch hook for securely blocking the latch hook in its closed position.

The nested configuration of the rotary retainer 74 and the latch hook 72 provides a simple mechanism for securely latching closed the forward louver doors 54. Aerodynamic and mechanical reaction loads are efficiently carried through the latch pins 70 into the corresponding latch hook 72 and the supporting latch box, with in turn permits a relatively simple and light weight control mechanism for the rotary position of the retainer 74. The visual indicator pin 92 is conveniently introduced into the control linkage 84 and provides a visual indication external of the nacelle of the corresponding position of the rotary retainers and the cooperating latch hooks 72.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

I claim:

1. A thrust reverser comprising:
    a nacelle having radially outer and inner skins extending axially from a leading edge defining an inlet to a trailing edge defining an outlet;
    an outer door disposed in said outer skin, and pivotally mounted at a proximal end to said nacelle;
    a latch pin fixedly mounted to a distal end of said door;
    a latch hook having a first shaft pivotally mounted to said nacelle for engagement with said pin to latch closed said door in said outer skin; and
    a rotary retainer having a second shaft extending transverse to said first shaft and adjoining said hook for blocking rotation of said hook to latch closed said door, and selectively unblocking rotation of said hook to permit said pin to disengage said hook.

2. A reverser according to claim 1 further comprising:
    a latch box fixedly mounted to said nacelle, and having an open pocket facing said latch pin; and
    said latch hook is pivotally mounted by said first shaft inside said box for carrying reaction loads from said door through said pin, hook, and box into said nacelle.

3. A reverser according to claim 2 wherein said retainer is pivotally mounted by said second shaft to a back wall of said box, and said hook is pivotally mounted by said first shaft between opposite sidewalls of said box.

4. A reverser according to claim 3 wherein:
    said latch hook comprises a corner at a forward end thereof, and a slot extending parallel to an outwardly projecting ledge at an aft end thereof for receiving said pin; and
    said retainer comprises a back plate having a cam extending in part circumferentially along the perimeter thereof to abut said corner and block rotation of said hook, and terminating at a step to receive said corner and unblock rotation of said hook.

5. A reverser according to claim 4 further comprising means for selectively rotating said retainer to block rotation of said hook to retain said pin in said slot, and unblock rotation of said hook to permit disengagement of said pin from said slot.

6. A reverser according to claim 5 wherein said retainer rotating means comprise:
    an arcuate rod extending circumferentially behind said box;
    an actuator joined to said rod for selective rotation in opposite circumferential directions around said nacelle; and
    linkage joining said rod to said retainer for rotating said retainer in opposite directions corresponding with rotation of said rod.

7. A reverser according to claim 6 wherein said linkage comprises:
    a first lever joined to said second shaft extending through said back wall to said back plate;
    a bracket extending radially outwardly from said rod; and
    a link pivotally joined at opposite ends to said first lever and bracket substantially parallel to said rod.

8. A reverser according to claim 7 wherein:
    said rod is mounted to said nacelle in a plurality of guide rollers for circumferential movement therearound; and
    said bracket includes a circumferential slot slidingly mounted by a retention roller to said box for preventing tilting of said rod.

9. A reverser according to claim 7 further comprising:
    an indicator pin extending radially behind said box; and
    a second lever joined at a proximal end to said second shaft, and at a distal end to said pin for extending and retracting said pin from said outer skin as said retainer is rotated to correspondingly unblock and block said latch hook.

10. A reverser according to claim 6 further comprising a spring driven plunger mounted in a bottom wall of said box in engagement with an underside of said ledge to bias outward said latch hook when said step receives said corner.

11. A reverser according to claim 10 further comprising means for selectively deploying open said door and unlatching said pin from said latch hook, and retracting closed said door to engage said pin against said ledge and depress said plunger as said latch hook rotates closed.

12. A thrust reverser comprising:
    a nacelle having an inlet and an outlet at opposite axial ends;
    a plurality of thrust reverser doors spaced circumferentially apart around said nacelle to close corresponding apertures through said nacelle, each door being hinged at an aft end to said nacelle, and including a latch pin at a forward end;
    a plurality of latch boxes disposed at forward ends of respective ones of said apertures;
    each latch box including a latch hook pivotally mounted therein for engaging said latch pin to latch closed said door atop said aperture, and a rotary retainer pivotally mounted behind said hook to selectively block and unblock rotary movement of said hook; and means for rotating in unison said retainers to selectively block and unblock rotary movement of corresponding ones of said hooks.

13. A reverser according to claim 12 wherein said retainer rotating means comprise:

an arcuate control rod extending circumferentially behind said latch boxes;

an actuator joined to said rod for selective rotation in opposite circumferential directions around said nacelle; and linkage joining said rod to said retainers for rotating said retainers in unison in opposite directions corresponding with rotation of said control rod.

14. A reverser according to claim 13 wherein each of said latch boxes further comprises:

an open pocket facing a corresponding latch pin;

opposite sidewalls pivotally supporting a corresponding latch hook; and a back wall pivotally supporting said retainer behind said latch hook.

15. A reverser according to claim 14 wherein:

each of said latch hooks comprises a corner at a forward end thereof, and a slot extending parallel to an outwardly projecting ledge at an aft end thereof for receiving said pin; and each of said retainers comprises a back plate having a cam extending in part circumferentially along the perimeter thereof to abut said corner and block rotation of said hook, and terminating at a step to receive said corner and unblock rotation of said hook.

16. A reverser according to claim 15 wherein said linkage comprises:

a first lever joined to a shaft extending through said back wall to said back plate;

a bracket extending radially outwardly from said rod; and a link pivotally joined at opposite ends to said first lever and bracket substantially parallel to said rod.

17. A reverser according to claim 16 wherein:

said rod is mounted to said nacelle in a plurality of guide rollers for circumferential movement therearound; and said bracket includes a circumferential slot slidingly mounted by a retention roller to said box for preventing tilting of said rod.

18. A reverser according to claim 17 further comprising:

an indicator pin extending radially behind each of said latch boxes; and a second lever joined at a proximal end to said shaft, and at a distal end to corresponding ones of said pins for extending and retracting said pin from said nacelle as said retainers are rotated to correspondingly unblock and block said latch hooks.

19. A reverser according to claim 18 further comprising a spring driven plunger mounted in a bottom wall of each of said boxes in engagement with an underside of said ledges to bias outward said latch hooks when said steps receive said corners.

20. A reverser according to claim 19 further comprising means for selectively deploying open said doors and unlatching said pins from said latch hooks, and retracting closed said doors to engage said pins against said ledges and depress said plungers as said latch hooks rotate closed.

* * * * *